United States Patent [19]

Lohoff

[11] 4,122,234

[45] Oct. 24, 1978

[54] ARTICLE EMPLOYING A HEAT HARDENABLE LIQUID FILM FORMING COMPOSITION WITH PARTICLES DISPERSED THEREIN AND METHOD FOR MAKING SAME

[75] Inventor: Virgil Allan Lohoff, Santa Clara, Calif.

[73] Assignee: Dysan Corporation, Santa Clara, Calif.

[21] Appl. No.: 822,771

[22] Filed: Aug. 8, 1977

[51] Int. Cl.$^2$ .................. H01F 10/02; B32B 5/16; B32B 27/38
[52] U.S. Cl. ...................... 428/413; 260/13; 260/37 EP; 428/481; 428/900
[58] Field of Search ............... 428/900, 413, 416, 418, 428/464, 481; 260/13, 37 EP

[56] References Cited

U.S. PATENT DOCUMENTS

| | | | |
|---|---|---|---|
| 2,710,845 | 6/1955 | Thompson | 260/13 |
| 2,732,367 | 1/1956 | Shokal | 260/13 X |
| 3,009,847 | 11/1961 | Alles et al. | 428/413 X |
| 3,474,073 | 10/1969 | Higashi | 260/37 EP |
| 3,808,079 | 4/1974 | Akashi et al. | 428/900 X |
| 4,049,566 | 9/1977 | Brilovich et al. | 428/900 X |
| 4,070,522 | 1/1978 | Ogasa et al. | 428/413 X |
| 4,074,012 | 2/1978 | Heikkinen | 428/413 X |
| 4,075,384 | 2/1978 | Suzuki et al. | 428/900 X |

*Primary Examiner*—Harold Ansher
*Attorney, Agent, or Firm*—Townsend and Townsend

[57] ABSTRACT

A magnetic coating composition in which magnetic iron oxide particles are dispersed into a solution of three components, which upon evaporation of the solvent and curing with elevated temperatures, results in a very smooth durable polymer coating having the magnetic particles dispersed uniformly therein. The three components in solution are an epoxy resin having an epoxide equivalent weight of approximately 400 or above, a polyamine whch has a minimum of one primary amine group and a cellulose acetate butyrate resin which has approximately 17 weight % butyral content or above. The polyamine, which acts as a catalyst to crosslink the composition, can be substituted for by hydroxyl compounds, a preferred one being formic acid (HCOOH) - an organic acid.

21 Claims, 3 Drawing Figures

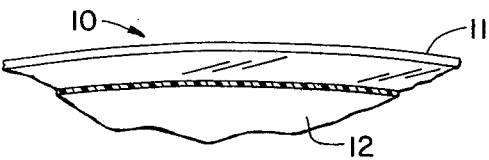
FIG. 1.
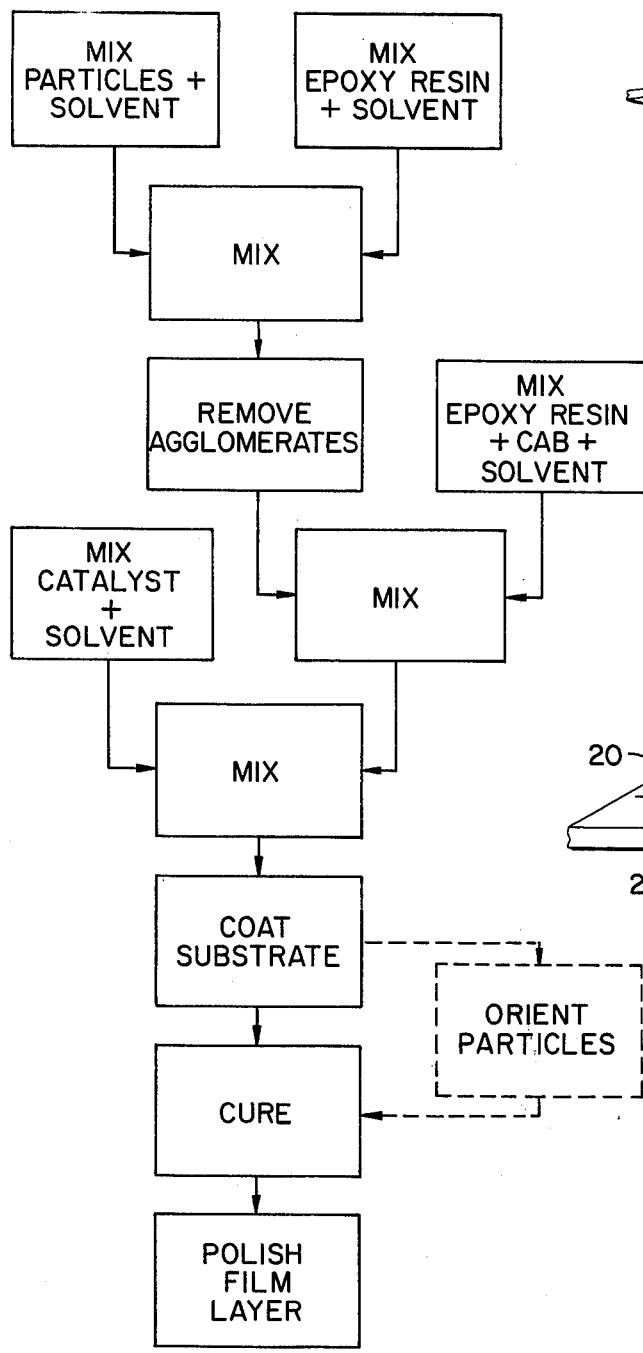
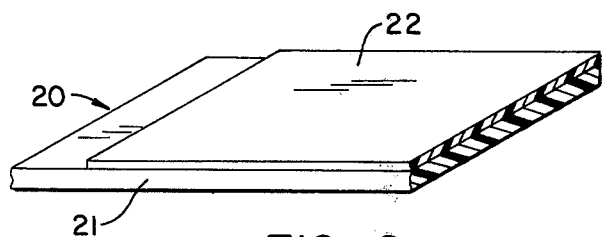
FIG. 2.
FIG. 3.

ARTICLE EMPLOYING A HEAT HARDENABLE LIQUID FILM FORMING COMPOSITION WITH PARTICLES DISPERSED THEREIN AND METHOD FOR MAKING SAME

BACKGROUND OF THE INVENTION

This invention relates to heat hardenable liquid film forming compositions having dispersed therein fine particulate material. More particularly, this invention relates to compositions of the above type used as a magnetic coating composition for memory devices, e.g. rigid magnetic memory discs, flexible magnetic memory discs (floppy discs), magnetic tape and the like.

Magnetic coating compositions are known which are used in the fabrication of magnetic memory elements such as magnetic memory discs used in "flying head" memory systems, magnetic memory tape, and the like. Such compositions typically comprise fine magnetizable particles, such as magnetic iron oxide particles, dispersed in a solvent-polymer solution. Such compositions are employed by forming a thin film of the solution on a substrate material, which may be either a rigid material such as aluminum or a flexible material such as a polyester film (e.g. MYLAR film), heating the substrate and film to evaporate the volatile solvents, and thereby form a cross-linked polymer with the magnetizable particles embedded therein. The film is typically applied to the substrate by one of several conventional processes, e.g. dip coating, spray coating, roller coating and spin coating.

Compositions of the above type known in the prior art have been found to suffer from one or more of the following disadvantages. Some compositions are incapable of maintaining the magnetizable particles suspended in solution for other than short periods of time, e.g. on the order of one hour or less, and must either be immediately applied to the substrate or must be continuously agitated by means of pumping, agitation or mixing equipment in order to keep the particles suspended therein. As a result, such compositions must either be used immediately after preparation, or expensive and cumbersome equipment must be provided, both of which are undesirable in many applications.

Other compositions are only compatible with a particular type of coating technique, such as dip coating or spray coating, and cannot be universally employed to provide the requisite film layer in many applications. Still other compositions suffer from poor adhesive capabilities, particularly when employed on rigid substrates such as aluminum discs, which requires that the substrate surface be pretreated by mechanical or chemical processing in order to provide a roughened surface to which compositions of this type may adhere with a proper bond. Still other compositions cure to a relatively soft surface hardness, resulting in a magnetic memory element with a shortened useful lifetime. In this connection, it is noted that magnetic memory elements employed in tape recorder applications are subjected to frictional wear resulting from direct contact with the recording and reproducing heads; thus, the less wear resistant the magnetic recording layer is to surface abrasion, the shorter the life of the tape.

Similarly, in magnetic memory elements used in rotating disc file memories, the magnetic recording layer is rotated at an extremely high speed closely adjacent one or more aerodynamically supported read/write transducer heads which float on a cushion of air therebetween. However, it frequently happens that the surface of the transducer contacts the surface of the moving magnetic recording layer. At the extremely high speeds employed, unless the recording layer is resistant to abrasion by virtue of this surface contact, the useful lifetime of the magnetic memory disc is sharply reduced.

Moreover, in high-speed applications, such as magnetic rotating disc memories and high-speed linear tape drives, the linear acceleration forces experienced by the magnetizable particles embedded in the film layer are of sufficient magnitude to cause the particles to be ejected from the magnetic recording layer absent a bond of sufficiently great strength. Aside from the fact that this ejection weakens the magnetic susceptibility of the recording layer, this problem is compounded by the fact that the ejected magnetizable particles accumulate on the surface of the associated transducer which impairs the aerodynamic characteristics of the transducer and its associated support and ultimately results in "crashing" of the head into the magnetic recording surface, which destroys the utility of the entire memory disc.

Still other known magnetic coating compositions possess inferior flowout properties which frequently result in a finished layer with undesirable coating asperities, such as lines, streaks, craters and voids.

Also, other known magnetic coatings possess properties that result in poor ability to properly orient the magnetic particles, when an orienting field is applied to the "wet" coating during the coating process.

Efforts to produce a magnetic coating composition devoid of the above-noted disadvantages have not met with success to date.

SUMMARY OF THE INVENTION

The invention comprises a coating composition with fine particulate matter dispersed therein which is capable of forming extremely thin uniform films on a substrate surface and which possesses several desirable physical characteristics.

In a first aspect, the invention comprises a coating composition which is relatively easy to prepare and which has a relatively long "pot life" at room temperature conditions. The composition is preferably prepared by admixing fine particles to be embedded in the finished composition with a starting composition of an epoxy resin and a solvent, admixing the resulting intermediate composition with an intermediate composition of epoxy resin and a cellulose acetate butyrate in a solvent, and finally admixing a catalyst, either a primary amine or an hydroxyl compound. The epoxy resins employed have between one and three epoxy groups per polymer unit and epoxy equivalent weights varying in the range from about 185 to about 6,000. The cellulose acetate butyrate polymer resins employed have a butyral content of at least 17 weight percent. The polyamine catalysts employed have at least one primary amine group per molecule, while the hydroxyl compound catalysts may comprise one of many such compounds such as monoalcohols, diols, triols, chlorohydrines, organic acids (with formic acid being preferred), and phenols.

When a polyamine is used as the catalyst, the epoxide equivalent to amine equivalent ratio lies in the range from ¼ to 4/1, with 1.2/1.0 being the preferred ratio. When an hydroxyl compound is used as the catalyst, the amount of hydroxyl employed is based on a weight percentage of the solid epoxy resin and lies in the range from about 5 to about 40 weight percent, the preferred range being about 20 weight percent of the solid epoxy resin.

The amount of cellulose acetate butyrate employed lies in the range from about 5 weight percent to about 30 weight percent of the total combined weight of the epoxy resin, cellulose acetate butyrate resin and the catalyst employed, with the preferred range being about 10 to 20 weight percent.

When the composition is prepared for use with magnetic particles, the solid pigment (i.e., oxide particles) to solid binder weight ratio lies in the range from about 40/100 to about 85/100. Several types of magnetic particles may be employed with the invention, such as magnetic iron oxide, magnetic chromium dioxide, other magnetic doped oxides, alloy particles, and other such particulate materials commonly used in the art of producing magnetic film coatings. The range of particle sizes is from about 0.10 micron to about 1.0 micron, with length to width ratios in the range from about 4/1 to about 15/1.

In oder to enable the formation of extremely thin uniform coatings, various types of volatile solvents are added to the solid constituents, such as esters, ketones, and glycol ethers. The concentration of solvents may vary in the range from about 100 to about 600 parts by weight of volatile solvents to 100 parts by weight of combined oxide plus binder solvents.

The coating composition per se possesses excellent flow out properties and adhesion properties, particularly to smooth metallic surfaces, such as aluminum, and is further capable of maintaining the particulate material in solution without settling for long periods of time. In addition, the coating composition has been found to facilitate orientation of the magnetic particles during fabrication of magnetic memory elements with the result that magnetic memory discs having a relatively high bit storage capability can be reliably produced with the composition.

In another aspect of the invention, the composition is applied to a substrate material in order to form a magnetic recording element. The substrate material may be either rigid, such as an aluminum disc, or flexible, such as a polyester film in the shape of a disc or a tape. Several types of coating techniques can be employed, such as dip coating, spray coating, roller coating and spin coating, the latter being preferred, and provide excellent results. After the step of coating, the magnetic recording element is cured at an elevated temperature in the neighborhood of 210° C. to about 240° C. for a sufficient period of time to drive off the volatile solvents and cause cross-linking of the polymers. After curing and cooling the magnetic recording element is polished to a very fine surface finish, such as 1.0 microinch center line average (CLA) for magnetic memory discs. The resulting magnetic memory elements exhibit a magnetic recording surface which is very smooth and resistant to abrasion and shedding of the particulate matter embedded therein. The surface is further highly resistant to conventional cleaning solvents and dries to a thin, smooth continuous surface without perceptible streaks, lines, craters, voids or other asperities.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a fragmentary perspective view, partially broken away, of a magnetic disc memory element;

FIG. 2 is a fragmentary view of a magnetic tape memory element; and

FIG. 3 is a process flow chart illustrating preparation of the coating composition and a magnetic memory element.

DESCRIPTION OF THE PREFERRED EMBODIMENTS

Turning now to the drawings, FIG. 1 illustrates a fragmentary portion of a magnetic memory disc generally designated by reference numeral 10 of the type employed in rotating disc memory and typically having a circular, substantially planar geometric shape. Disc 10 has a substrate 11 typically comprising aluminum for so-called rigid discs, or a polyester film such as MYLAR film for so-called flexible or floppy discs. Adhered to both surfaces of the substrate 11 is a magnetic recording layer 12 comprising a cross-linked polymer with magnetizable particles, such as iron oxide particles, embedded therein (not illustrated).

With reference to FIG. 2, a magnetic tape recording element generally designated with reference numeral 20 is illustrated and includes a flexible substrate 21, typically a polyester film such as MYLAR, and a magnetic recording layer 22 substantially identical to layer 12. Recording layers 12 and 22 are formed to a thickness in the range from about 10 microinches to 200 microinches from the coating composition described in detail below using dip coating, spray coating, roller coating or spin coating techniques. Since such techniques are well-known in the art, further description thereof will be omitted to avoid prolixity.

In general, the novel coating composition comprises a mixture of fine particulate material dispersed in an epoxy resin in a solution, a cellulose acetate butyrate in a solvent, and a catalyst comprising either a primary amine or an organic acid which, when applied to a substrate 11, 21 and subjected to an elevated temperature such as 210° C. or greater for a sufficient period of time, preferably approximately three hours, causes the solvent to evaporate and the remaining organic constituents of the composition to cross-link or interact together to form a thin, tough, continuous and solvent resistent film exhibiting excellent magnetic memory storage properties.

For compositions employed to produce magnetic recording layers, such as layers 12, 22, the fine particulate material may comprise various types of known magnetic particulate substances, such as magnetic iron oxide, magnetic chromium dioxide and other magnetizable doped oxides, magnetizable alloy particles and the like. Such substances have particle sizes ranging from about 0.10 micron to about 1.0 micron, length to width ratios ranging from about 4/1 to about 15/1, and a coercive force in the range from about 250 to 1000 oersteds. In a specific embodiment of the invention, a magnetic iron oxide manufactured by Charles Pfizer and Co. and sold in the trade as MO 2228 and having a coercive force $H_c$ of from about 315 to about 335 oersteds and a specific magnetic moment of 78 EMU/GM (minimum) has been found particularly useful.

The epoxy resins employed in the composition are those having between one and three epoxy groups per polymer unit and epoxy equivalent weights lying in the range from about 185 to about 6,000. Many commercially available epoxy resins are suitable, such as the DER series available from Dow Chemical, the Araldite series available from Ciba, the EER series available from Union Carbide, and the EPOTUF series available from Reichhold. The preferred epoxy resins actually employed in a specific embodiment of the invention are those available from Shell Chemical Co. and known in the trade as "Epons". Substantially all of the Epon series from Epon 828 to Epon 1010, which vary in epoxide equivalent weights from about 185 to about 6,000, can be employed, with the preferred "Epon" being Epon 1001 having an epoxide equivalent of about 450 to about 550 and a melting point of about 65° to about 75° C.

The Cellulose Acetate Butyrate (CAB) polymer resins used in this coating composition are prepared by the reaction of purified cellulose with acetic and butyric anhydrides with sulfuric acid as catalyst and glacial acetic acid as solvent. The ratio of acetic and butyric components can be varied over a wide range. These synthetic resins of high molecular weight are made in various grades designated mainly by % Butyral contents and are closely controlled to form polymers having a predetermined ratio of Butyral groups, acetyl groups and hydroxyl groups along the cellulose chain.

The preferred cellulose acetate butyrate resins are manufactured by Eastman Chemical Corporation under the trade name Eastman EAB Cellulose Acetate Butyrate. These are manufactured with various % Butyral contents as follows:

|  | EAB 171–15 | EAB 272–20 | EAB 381–2 | EAB 500–5 |
|---|---|---|---|---|
| % Butyral (Ave) | 17 | 26 | 37 | 48 |
| % Acetal (Ave) | 29.5 | 20.5 | 13 | 6 |
| % Hydroxyl (Ave) | 1.5 | 2.5 | 2 | 0.7 |
| Viscosity (Seconds) | 10–21 | 15–35 | 1–3.5 | 4–6 |

Essentially all of the cellulose acetate butyrate types described above may be used in the coating composition. Two preferred types of CAB are EAB-171-15 and 272-20 which appear to give a harder, tougher, more solvent-resistant film than do other CAB resins with higher % Butyral contents. The cellulose acetate butyrate constituent provides several unique characteristics in the magnetic coating composition. For example, when used in the fabrication of rotating memory disc elements, coating compositions employing epoxy resins alone cure to a film coating having severe radially extending lands and grooves or striations, thereby producing a film surface which is extremely difficult to polish to an acceptable surface smoothness. The present composition, however, employing cellulose acetate butyrate, cures to a thin smooth continuous film in such applications. In addition, the inclusion of the cellulose acetate butyrate in the present composition has been found to function as a particle suspension agent for both magnetic iron oxide particles and other particles, such as pigments, which substantially reduces settling out of the particles from the composition when standing for long periods of time. For example, the particular composition described below exhibits substantially no settling out of iron oxide particles over a period of 24 hours after preparation. Since the present composition remains substantially homogeneous during such a relatively long period of time, no costly production pumps, mixing equipment or agitation equipment is required in order to maintain the composition useable.

Many polyamine catalysts may be employed in the present invention such as triethylamine, diethylene, triamine, tri-ethylene-tetramine, ethylene diamine, and others. It is, however, essential that the polyamine have a primary amine in order to obtain satisfactory results. In the specific embodiment described below, the preferred polyamine is N-aminoethylpiperazine having a molecular weight of 129.2 and an equivalent weight of 65.5 and available from the Jefferson Chemical Company.

Alternatively, several hydroxyl compounds may be employed as the catalyst, such as monoalcohols (n-Butyl alcohol), diols, triols (propylene glycol), chlorohydrins, organic acids (acetic acid, formic acid), and phenols. The preferred hydroxyl compound is formic acid (HCOOH) available from commercial sources in 85 to 90 percent pure grades.

The relative proportions of the various constituents range as follows. When a polyamine catalyst is used, the epoxide equivalent to amine equivalent ratio may lie in the range from about ¼ to about 4/1, with a preferred ratio of 1.2/1.0. When an hydroxyl compound catalyst is employed, the relative proportion is based on a weight percentage of the solid epoxy resin and may lie in the range of from about 5 weight percent to about 40 weight percent, with a preferred value of about 20 weight percent. The amount of cellulose acetate butyrate employed may range from about 5 weight percent to about 30 weight percent of the total combined weight of the epoxy resin, cellulose acetate butyrate resin, and the amine or hydroxyl compound, with a preferred ratio lying in the range from about 10 to 20 weight percent for the CAB. The magnetizable particles may comprise about 40 to about 80% by weight of the total weight of the above ingredients.

Several types of volatile solvents can be used in producing the present composition to reduce the solids content so that very thin coatings can be applied to the substrate. Examples of the various classes of solvents which may be added to the resins and the particulate dispersions are:

Esters-butyl carbitols, butyl cellosolve, and cellosolve acetate

Ketones-acetone, methyl ethyl ketone, isophorone, cyclohexanone, and diacetone alcohol Glycol ethers-Cello-Solve (ethylene glycolethyl ether), diethylene glycol methyl ether, Bis (2-methoxyethyl) ether, and diethylene glycol n-butyl ether.

The preferred solvents employed in the specific embodiment described below are Cello-Solve and Bis (2-methoxy ethyl) ether. The solvent concentration may lie in the range from 100 to about 600 parts by weight of volatile solvent to 100 parts by weight of combined oxide solids plus binder solids. It should be noted that the above exemplary list is not exclusive, and that other solvents may be employed.

SPECIFIC EXAMPLES

| Components | Parts By Weight | Weight % Solids |
|---|---|---|
| Example #1 |  |  |
| Magnetic iron-oxide (Pfizer MO2228) | 57.0 | 57.0 |
| 60% Epon 1001 in Cellosolve | 58.2 | 34.9 |

-continued

| Components | Parts By Weight | Weight % Solids |
|---|---|---|
| 7% 171-15 CAB in Cyclohexanone | 61.4 | 4.3 |
| Cellosolve Acetate | 60.3 | — |
| 100% N-aminoethylpiperazine | 3.8 | 3.8 |
| Cello-Solve | 109.0 | — |
|  | 349.7 | 100.0 |
| Example #2 | | |
| Magnetic iron-oxide (Pfizer MO2228) | 57.0 | 57.0 |
| 60% Epon 1001 in Cellosolve | 58.2 | 34.9 |
| 7% 171-15 CAB in Bis-(2methoxyethyl)ether | 61.4 | 4.3 |
| Cello-Solve | 60.3 | — |
| 100% N-Aminoethylpiperazine | 3.8 | 3.8 |
| Bis(2-methoxyethyl)ether | 109.0 | — |
|  | 349.7 | 100.0 |
| Example #3 | | |
| Magnetic iron oxide (Pfizer M02228) | 57.0 | 57.0 |
| 60% Epon 1001 in Cellosolve | 58.2 | 34.9 |
| 7% 171-15 CAB in Cyclohexanone | 61.4 | 4.3 |
| Cellosolve Acetate | 60.3 | — |
| Formic Acid (88% Concentration) | 7.0 | — |
| Cello-Solve | 109.0 | — |
|  | 352.9 | 96.2 |

Examples 1 and 2 illustrate compositions employing different solvents while Example 3 illustrates a composition employing a different type of epoxy catalyst. With reference to FIG. 3, example 1 is prepared as follows. A magnetic particle dispersion is first prepared by adding 57.0 parts of magnetic iron oxide to 60.3 parts of Cellosolve acetate, and stirring the mixture for a time period in the range from 2 to 4 hours. A 60 percent solution of Type Epon 1001 epoxy resin is then added in the amount of 45.6 parts, and this mixture is milled until free of agglomerates. Next, 12.6 parts of 60 percent Epon 1001 and 61.4 parts of 7 percent type 171-15 cellulose acetate butyrate is added to the milled mixture. Lastly, 3.8 parts of N-aminoethylpiperazine plus 109.0 parts of Cello-Solve solvent were added to adjust the final viscosity of the total mixture to approximately 325 cps at 24° C. as measured by a Brookfield viscometer, No. 2 spindle at 20 rpm. Examples 2 and 3 are prepared in a similar fashion.

Coating compositions prepared according to the teachings of the invention may be applied to either rigid or flexible substrates of the type noted above with excellent results. In the case of a magnetic memory disc having a rigid substrate, the composition is coated onto an aluminum disc using a conventional spin coating technique, and the magnetizable particles are oriented circumferentially of the disc surface using a conventional magnetic field orientation technique, after which the disc is cured at an elevated temperature of from about 210° C. to about 240° C. for approximately 3 hours. Upon cooling, the disc is polished to about 1.0 microinch (CLA) finish, after which the disc may be certified on special error detection equipment known in the art and employed to check the magnetic integrity of the surface. After certification, several of such discs are typically assembled into various types of disc packs.

Magnetic memory discs fabricated according to the teachings of the invention have been found to possess superior digital data storage capability than prior art discs, which is believed due to the property possessed by the coating composition of enabling a greater percentage of the magnetizable particles to be circumferentially oriented. A popular technique for measuring the data storage capability comprises preparing a magnetic memory disc without orienting the magnetizable particles while the coating composition is still in the liquid state, preparing a second disc with the orienting step included, recording identical digital data on both discs, reading the recorded data from both discs, and comparing the amplitudes of the output signal obtained during the reading step. With known prior art discs, the oriented disc typically exhibits an average amplitude increase over the unoriented disc which lies in the range from about 15 to 25%. With discs fabricated using the compound of the invention, the average amplitude increase lies in the range from about 25 to 35%. Due to this enhanced digital data storage capability, magnetic memory discs fabricated according to the teachings of the invention function in a manner superior to prior art memory discs, particularly in applications requiring high bit storage density.

While the above provides a full and complete disclosure of the preferred embodiment of the invention, various modifications, alternate constructions and equivalents may be employed without departing from the true spirit and scope of the invention. For example, although the disclosure of the specific embodiment has been directed toward the preparation of magnetic recording compositions and films, the composition of the invention may also be used for any application in which the requirements are a relatively thin film with particulate matter embedded therein, such as a paint vehicle or other protective coating. Therefore, the above description and illustrations should not be construed as limiting the scope of the invention, which is defined by the appended claims.

What is claimed is:

1. A heat hardenable liquid magnetic film forming composition comprising:

an epoxy resin having an epoxide equivalent weight lying in the range from about 185 to about 6,000 a cellulose acetate butyrate resin having a butyral content of at least 17%, an amine catalyst having at least one primary amine group, the amount of cellulose acetate butyrate lying in the range from about 5 to about 30 weight percent of the combined weights of said epoxy resin, said cellulose acetate butyrate resin and said amine, the ratio of epoxy equivalents to amine equivalents lying in the range from about ¼ to about 4/1, a solvent blend providing a viscosity for said composition lying in the range from about 150 to about 600 centipoise at 24° Centigrade, and magnetizable particles dispersed within said composition, said composition having the above ingredients in the following proportionate ranges:

| Ingredient | Parts By Weight | Weight % Solids |
|---|---|---|
| Magnetizable particles | 50–60 | 50–60 |
| Epoxy resin plus solvent | 40–65 | 30–40 |
| Cellulose acetate butyrate plus solvent | 30–190 | 3–6 |
| Amine catalyst | 2–5 | 2–5 |
| Remaining solvent | 135–190 | |

2. The composition of claim 1 wherein said amine comprises N-aminoethylpiperazine.

3. The composition of claim 1 wherein said magnetizable particles are ferromagnetic.

4. The composition of claim 3 wherein said particles comprise magnetic iron oxide.

5. The combination of claim 4 wherein said particles have a coercive force lying in the range from about 250 to about 1000 oersteds and a specific magnetic moment of at least 78 emu/gm.

6. A magnetic memory element comprising a substrate having an upper surface and a heat hardened layer adhered to said upper surface and formed from the composition of claim 1, said layer comprising a polymer resulting from the cross-linking of said epoxy resin having an equivalent weight of from about 185 to about 6,000 said cellulose acetate butyrate resin having a butyral content of at least 17 weight percent and said catalyst, and magnetizable particles dispersed therein.

7. The combination of claim 6 wherein said substrate further includes a lower surface, and further including a heat hardened layer adhered to said lower surface which is substantially identical to said heat hardened layer adhered to said upper surface.

8. The combination of claim 6 wherein said substrate is substantially rigid.

9. The combination of claim 6 wherein said substrate is fabricated from a flexible material.

10. The combination of claim 6 wherein said polyamine is N-aminoethylpiperazine.

11. A method of making a heat hardenable liquid film-forming composition with particles dispersed therein, said method comprising the steps of:
 (a) providing an epoxy resin having epoxy equivalent weights in the range from about 185 to about 6,000, a cellulose acetate butyrate resin having a butyral content of at least 17 percent, an amine catalyst with at least one primary amine group, magnetizable particulate material and a solvent blend; the amount of said cellulose acetate butyrate lying in the range from about 5 to about 30 weight percent of the combined weights of said epoxy resin, said cellulose acetate butyrate and said amine; and
 (b) mixing the ingredients of step (a) together in the following proportions to form said composition:

| Ingredient | Parts By Weight | Weight % Solids |
| --- | --- | --- |
| Magnetizable particles | 50–60 | 50–60 |
| Epoxy resin plus solvent | 40–65 | 30–40 |
| Cellulose acetate butyrate | 30–190 | 3–6 |

-continued

| Ingredient | Parts By Weight | Weight % Solids |
| --- | --- | --- |
| plus solvent | | |
| Amine catalyst | 2–5 | 2–5 |
| Remaining solvent | 135–190 | |

12. The method of claim 11 wherein said magnetizable particulate material comprises individual particles having a size in the range from about 0.10 micron to about 1.0 micron.

13. The method of claim 12 wherein said particles have a length to width ratio in the range from about 4/1 to about 15/1.

14. The method of claim 11 wherein said epoxy resin has between one and three epoxy groups per polymer unit.

15. The method of claim 11 wherein said amine catalyst comprises N-aminoethylpiperazine.

16. The method of claim 11 wherein said step of mixing includes the step of treating said ingredients to substantially eliminate agglomerates.

17. The method of claim 16 wherein said step of treating includes the step of milling said ingredients.

18. The method of claim 11 further including the steps of:
 (c) providing a substrate material with a substantially flat surface;
 (d) coating said surface with said composition; and
 (e) curing the composition coating on said surface to provide a polymer film resulting from the cross-linking of said epoxy resin and said cellulose acetate butyrate.

19. The method of claim 18 wherein said step of curing includes the step of heating the composition coated on said surface to a temperature of at least about 210° Centigrade for a predetermined time period.

20. The method of claim 19 wherein said predetermined time period is substantially 3 hours.

21. The method of claim 18 wherein said substrate material comprises a disc, and further including the step of orienting said particles circumferentially of said disc while said composition is in the liquid state.

* * * * *